(12) United States Patent
Laurenti

(10) Patent No.: US 6,499,098 B1
(45) Date of Patent: Dec. 24, 2002

(54) PROCESSOR WITH INSTRUCTION QUALIFIERS TO CONTROL MMU OPERATION

(75) Inventor: Gilbert Laurenti, Saint Paul de Vence (FR)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/411,408

(22) Filed: Oct. 1, 1999

(30) Foreign Application Priority Data

Oct. 6, 1998 (EP) .............................. 98402455
Mar. 8, 1999 (EP) .............................. 99400555

(51) Int. Cl.⁷ ................................................ G06F 15/00
(52) U.S. Cl. ...................... 712/209; 712/213; 712/226
(58) Field of Search .................. 712/209, 212, 712/213, 215, 226, 227

(56) References Cited

U.S. PATENT DOCUMENTS

| | | | | |
|---|---|---|---|---|
| 3,878,514 A | * | 4/1975 | Faber ........................ | 712/200 |
| 4,025,771 A | * | 5/1977 | Lynch ........................ | 235/156 |
| 5,303,358 A | * | 4/1994 | Baum ......................... | 395/375 |
| 5,404,560 A | * | 4/1995 | Lee et al. ................... | 712/208 |
| 5,845,102 A | * | 12/1998 | Miller et al. ................ | 395/387 |
| 5,923,705 A | * | 7/1999 | Willkie et al. .............. | 375/220 |
| 6,076,156 A | * | 6/2000 | Pickett et al. .............. | 712/226 |

* cited by examiner

Primary Examiner—Richard L. Ellis
Assistant Examiner—Tonia Meonske
(74) Attorney, Agent, or Firm—Gerald E. Laws; W. James Brady, III; Frederick J. Telecky, Jr.

(57) ABSTRACT

A processor (100) is provided that is a programmable digital signal processor (DSP) with variable instruction length, offering both high code density and easy programming. Architecture and instruction set are optimized for low power consumption and high efficiency execution of DSP algorithms, such as for wireless telephones, as well as pure control tasks. An instruction (1003) is decoded and accesses a data item in accordance with an address field (1003a). Another instruction (1002) is decoded and accesses a data item in accordance with an address field (1002a); but in a different manner due to an instruction qualifier (1002b). The instruction qualifier is executed in an implicitly parallel manner with the qualified instruction (1002).

5 Claims, 7 Drawing Sheets

PROCESSOR WITH INSTRUCTION QUALIFIERS TO CONTROL MMU OPERATION

This application claims priority to S.N. 99400555.1, filed in Europe on Mar. 8, 1999 (TI-27763EU) and S.N. 98402455.4, filed in Europe on Oct. 6, 1998 (TI-28433EU).

1. Field of the Invention

The present invention relates to digital microprocessors, and more particularly to instruction sets for digital microprocessors.

2. Background of the Invention

Microprocessors are general purpose processors which require high instruction throughputs in order to execute software running thereon, and can have a wide range of processing requirements depending on the particular software applications involved. Instruction sets for microprocessors-typically contain different instructions for accessing data from various storage locations, such as main memory, I/O, or registers.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in, but not exclusively, applications such as mobile telecommunications applications, it is desirable to provide ever increasing DSP performance while keeping power consumption as low as possible.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims. The present invention is directed to improving the performance of processors, such as for example, but not exclusively, digital signal processors.

In accordance with a first aspect of the invention, there is provided a processor that is a programmable digital signal processor (DSP), offering both high code density and easy programming. Architecture and instruction set are optimized for low power consumption and high efficiency execution of DSP algorithms, such as for wireless telephones, as well as pure control tasks. The processor includes an instruction buffer unit operable to decode an instruction fetched from an instruction memory. The instruction may have a number of instruction formats. A data address generation unit is operable to calculate a first address of a first operand in response to a first instruction. The instruction buffer unit is further operable to decode a second instruction from the sequence of instructions in a combined manner while decoding the first instruction; such that the decoding of the first instruction is qualified by the second instruction. The processor has means for retrieving the first operand in response to the first address, means for manipulating the first operand, and means for providing an instruction address that identifies an instruction in the instruction stream to be decoded by the instruction buffer unit.

In accordance with another aspect of the present invention, the data address generation unit is operable to calculate a second address of a second operand instead of the first address in response to the second instruction.

In accordance with another aspect of the present invention, the first address of the first operand is in a memory address space, and the second address of the second operand is a memory mapped register.

In accordance with another aspect of the present invention, the first address of the first operand is in a memory address space, and the second address of the second operand is a peripheral device register.

In accordance with another aspect of the present invention, a method of operating a digital system is provided. A plurality of instructions are executed in an instruction pipeline of the processor core, wherein the instructions are fetched in response to a program counter from an instruction memory associated with the processor core, wherein the sequence of instructions are selected from an instruction set having a number of instruction formats. A first instruction from the sequence is decoded, wherein the first instruction has a first format selected from the plurality of instruction formats. A first data item is manipulated in a first manner in response to the step of decoding the first instruction. Later, a second instruction from the sequence is decoded, in this case the second instruction is identical to the first instruction. However, a qualifier instruction is decoded in a combined manner with the step of decoding the second instruction, such that the step of decoding the second instruction is qualified by the step of decoding the third instruction. A second data item is manipulated in response to the combined manner of decoding the second instruction and the qualifier instruction in a different manner than the step of manipulating the first data item.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the processor of FIG. 1, unless otherwise stated, and in which.

DESCRIPTION OF PARTICULAR EMBODIMENTS

Although the invention finds particular application to Digital Signal Processors (DSPs), implemented, for example, in an Application Specific Integrated Circuit (ASIC), it also finds application to other forms of processors.

The basic architecture of an example of a processor according to the invention will now be described. Processor 100 is a programmable fixed point DSP core with variable instruction length (8 bits to 48 bits) offering both high code density and easy programming. Architecture and instruction set are optimized for low power consumption and high efficiency execution of DSP algorithms as well as pure control tasks, such as for wireless telephones, for example. Processor 100 includes emulation and code debugging facilities.

Figure 1:
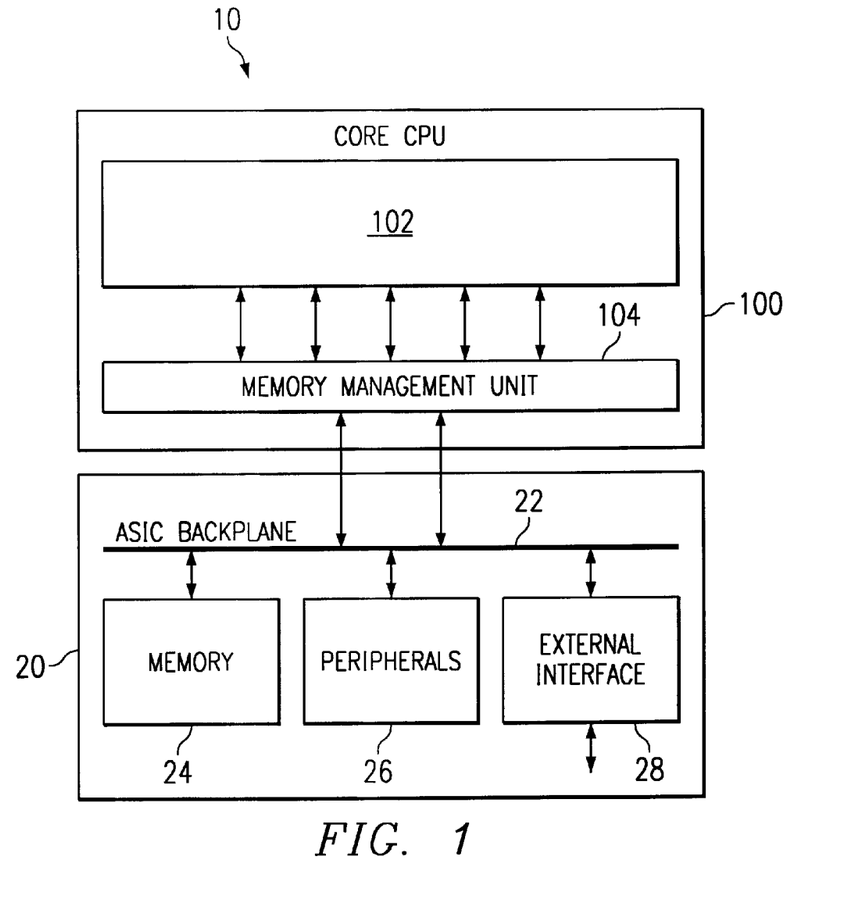
FIG. 1 is a schematic block diagram of a processor in accordance with an embodiment of the invention.

FIG. 1 is a schematic overview of a digital system 10 in accordance with an embodiment of the present invention. The digital system includes a processor 100 and a processor backplane 20. In a particular example of the invention, the digital system is a Digital Signal Processor System 10 implemented in an Application Specific Integrated Circuit (ASIC). In the interest of clarity, FIG. 1 only shows those portions of microprocessor 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 100 relevant to an embodiment of the present invention are explained in sufficient detail herein below, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features and a description of a complete set of instructions of the microprocessor of FIG. 1 is provided in co-assigned application Serial No. 09/410,977 (TI-28433), which is incorporated herein by reference.

As shown in FIG. 1, processor 100 forms a central processing unit (CPU) with a processor core 102 and a memory interface unit 104 for interfacing the processor core 102 with memory units external to the processor core 102.

Processor backplane 20 comprises a backplane bus 22, to which the memory management unit 104 of the processor is connected. Also connected to the backplane bus 22 is an instruction cache memory 24, peripheral devices 26 and an external interface 28.

It will be appreciated that in other examples, the invention could be implemented using different configurations and/or different technologies. For example, processor 100 could form a first integrated circuit, with the processor backplane 20 being separate therefrom. Process 100 could, for example be a DSP separate from and mounted on a backplane 20 supporting a backplane bus 22, peripheral and external interfaces. The processor 100 could, for example, be a microprocessor rather than a DSP and could be implemented in technologies other than ASIC technology. The processor or a processor including the processor could be implemented in one or more integrated circuits.

Figure 2:
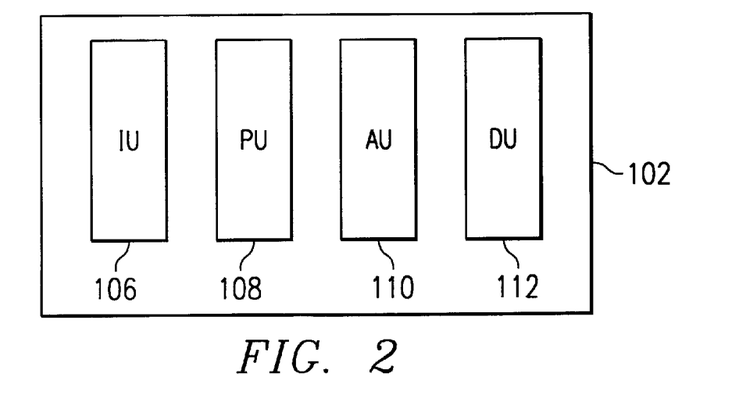
FIG. 2 is a schematic diagram of a core of the processor of FIG. 1.

FIG. 2 illustrates the basic structure of an embodiment of the processor core 102. As illustrated, this embodiment of the processor core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 3:
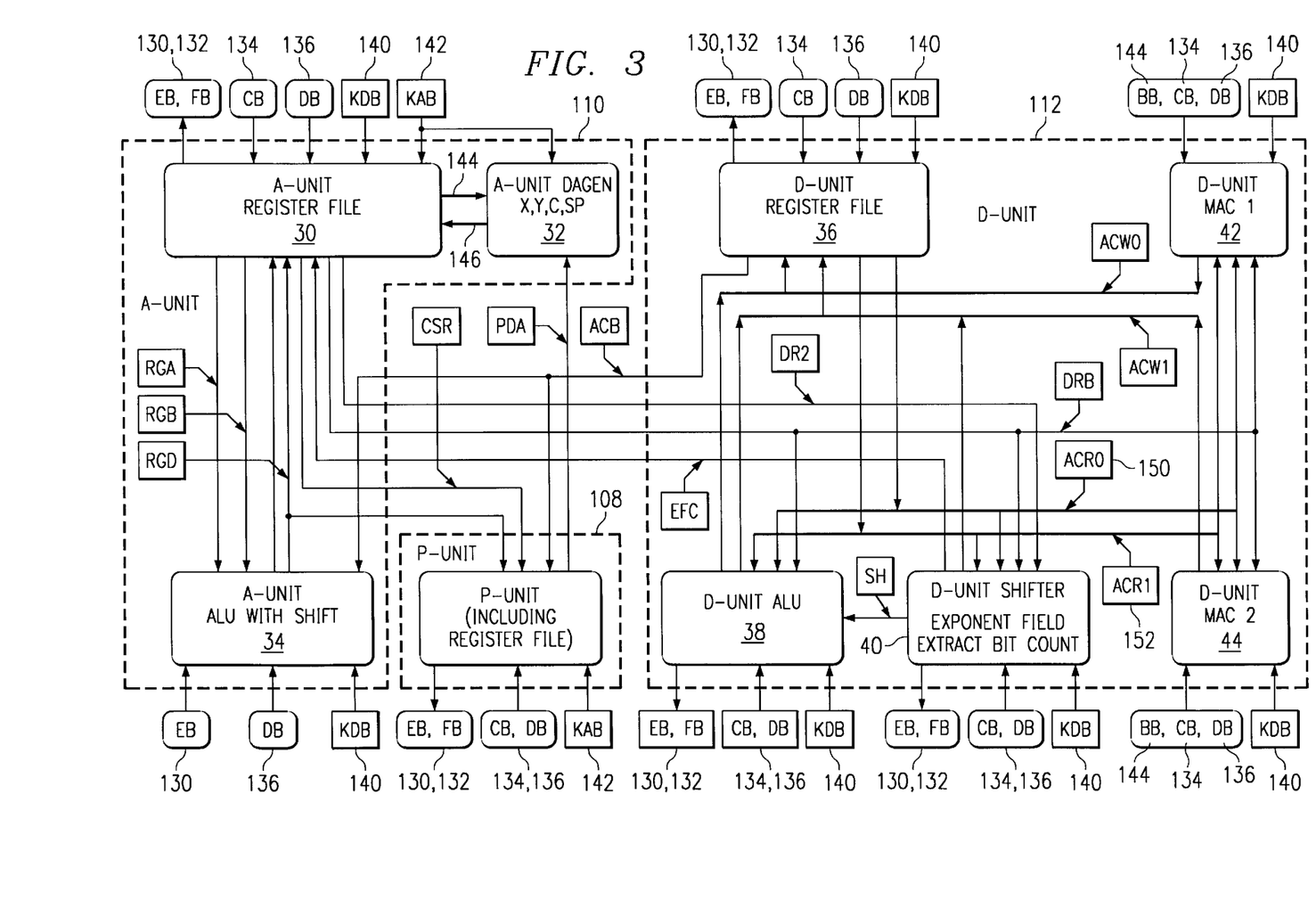
FIG. 3 is a more detailed schematic block diagram of various execution units of the core of the processor.

FIG. 3 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB) 134, 136 and an address constant bus (KAB) 142. Additionally, the P Unit 108 is coupled to sub-units within the A Unit 110 and D Unit 112 via various busses labeled CSR, ACB and RGD.

As illustrated in FIG. 3, in the present embodiment the A Unit 110 includes a register file 30, a data address generation sub-unit (DAGEN) 32 and an Arithmetic and Logic Unit (ALU) 34. The A Unit register file 30 includes various registers, among which are 16 bit pointer registers (AR0–AR7) and data registers (DR0–DR3) which may also be used for data flow as well as address generation. Additionally, the register file includes 16 bit circular buffer registers and 7 bit data page registers. As well as the general purpose busses (EB, FB, CB, DB) 130, 132, 134, 136, a data constant bus 140 and address constant bus 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16 bit X/Y registers and coefficient and stack pointer registers, for example for controlling and monitoring address generation within the processing engine 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose buses (EB,DB) 130,136 and an instruction constant data bus (KDB) 140. The A Unit is coupled to the P Unit 108 by a PDA bus for receiving register content from the P Unit 108 register file. The ALU 34 is also coupled to the A Unit register file 30 by buses RGA and RGB for receiving address and data register contents and by a bus RGD for forwarding address and data registers in the register file 30.

In accordance with the illustrated embodiment of the invention, D Unit 112 includes a D Unit register file 36, a D Unit ALU 38, a D Unit shifter 40 and two multiply and accumulate units (MAC1,MAC2) 42 and 44. The D Unit register file 36, D Unit ALU 38 and D Unit shifter 40 are coupled to buses (EB,FB,CB,DB and KDB) 130, 132, 134, 136 and 140, and the MAC units 42 and 44 are coupled to the buses (CB,DB, KDB) 134, 136, 140 and Data Read bus (BB) 144. The D Unit register file 36 includes 40-bit accumulators (AC0–AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write buses (ACW0, ACW1), and from the D Unit shifter 40 over accumulator write bus (ACW1). Data is read from the D Unit register file accumulators to the D Unit ALU 38, D Unit shifter 40 and MACs 1&2 42, 44 over accumulator read buses (ACR0, ACR1) 150, 152. The D Unit ALU 38 and D Unit shifter 40 are coupled via bus SH and also coupled to sub-units of the A Unit 108 via various buses labeled EFC, DRB, DR2 and ACB.

Figure 4:
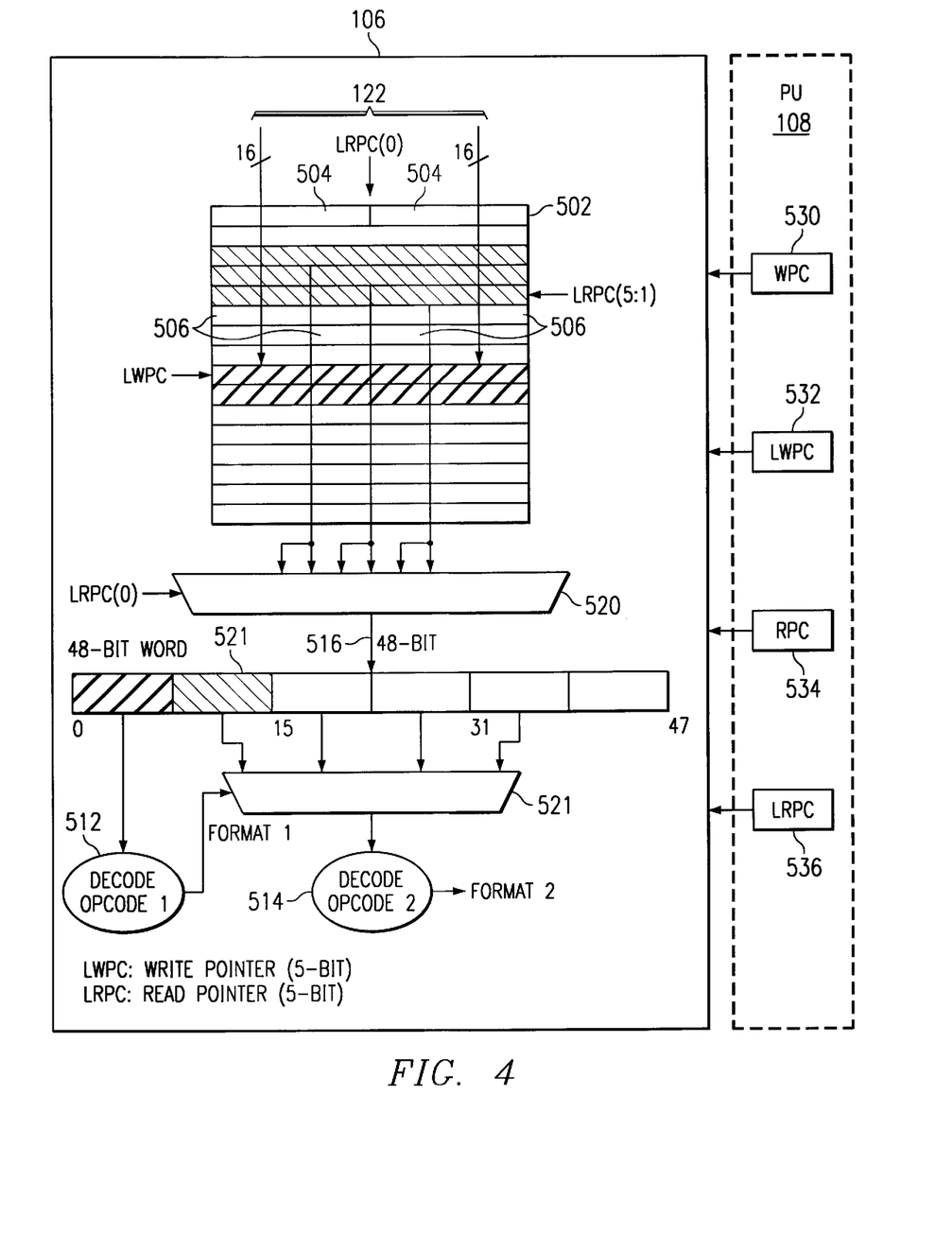
FIG. 4 is a schematic diagram of an instruction buffer queue and an instruction decoder of the processor.

Referring now to FIG. 4, there is illustrated an instruction buffer unit 106 in accordance with the present embodiment, comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder/s 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder/s 512/514.

In this embodiment, the instructions are formed into a 48 bit word and are loaded into the instruction decoders 512, 514 over a 48 bit bus 516 via multiplexors 520 and 521. It will be apparent to a person of ordinary skill in the art that the instructions may be formed into words comprising other than 48-bits, and that the present invention is not to be limited to the specific embodiment described above.

For presently preferred 48-bit word size, bus 516 can load a maximum of 2 instructions, one per decoder, during any one instruction cycle for parallel execution. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decode thereof. The multiplexing associated with the alignment of instructions with byte boundaries is performed in multiplexors 520 and 521.

Two instructions can be put in parallel if one of the two instructions is provided with a parallel enable bit. The hardware support for such type of parallelism is called the parallel enable mechanism. Likewise, two instructions can be put in parallel if both of the instructions make single data memory accesses (Smem, or dbl(lmem)) in indirect mode. The hardware support for such type of parallelism is called the soft dual mechanism.

Figure 5:
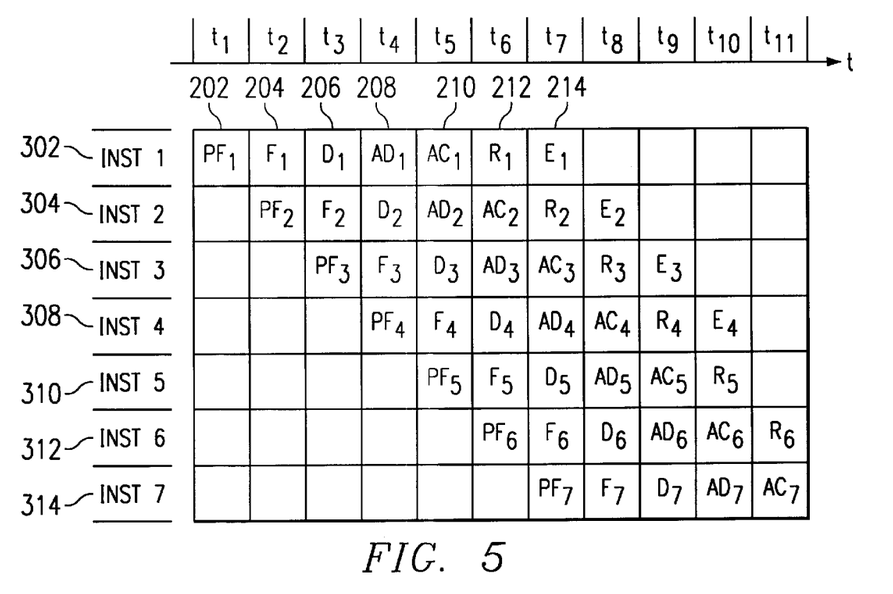
FIG. 5 is a schematic representation of the core of the processor for explaining the operation of the pipeline of the processor.

Processor core 102 executes instructions through a 7 stage pipeline, the respective stages of which will now be described with reference to Table 1 and to FIG. 5. The processor instructions are executed through a 7 stage pipeline regardless of where the execution takes place (A unit or D unit). In order to reduce program code size, a C compiler, according to one aspect of the present invention, dispatches as many instructions as possible for execution in the A unit, so that the D unit can be switched off to conserve power. This requires the A unit to support basic operations performed on memory operands.

TABLE 1 the Processor Pipeline Description for a
Single Cycle Instruction With No Memory Wait States

| Pipeline stage | | Description. |
|---|---|---|
| P0 | Pre-Fetch | Address program memory via the program address bus PAB. |
| P1 | Fetch | Read program memory through the program bus PB. Fill instruction buffer queue with the 4 bytes fetched in program memory. |
| P2 | Decode | Read instruction buffer queue (6 bytes) Decode instruction pair or single instruction. Dispatch instructions on Program Flow Unit (PU), Address Data Flow Unit (AU), and Data Computation Unit (DU). |
| P3 | Address | Data address computation performed in the 3 address generators located in AU: Pre-computation of address to be generated in: direct SP/DP relative addressing mode. indirect addressing mode via pointer registers. Post-computation on pointer registers in: indirect addressing mode via pointer registers. Program address computation for PC relative branching instructions: goto, call, switch. |
| P4 | Access | Read memory operand address generation on BAB, CAB, DAB buses. Read memory operand on CB bus (Ymem operand). |
| P5 | Read | Read memory operand on DB (Smem, Xmem operand), on CB and DB buses (Lmem operand), on BB (coeff operand) Write memory operand address generation on EAB and FAB buses. |
| P6 | Execute | Execute phase of data processing instructions executed in A unit and D unit. Write on FB bus (Ymem operand). Write Memory operand on EB (Smem, Xmem operand), on EB and FB buses (Lmem operand). |

The first stage of the pipeline is a PRE-FETCH (P0) stage 202, during which stage a next program memory location is addressed by asserting an address on the address bus (PAB) 118 of a memory interface 104.

In the next stage, FETCH (P1) stage 204, the program memory is read and the I Unit 106 is filled via the PB bus 122 from the memory interface 10 unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump. Respective computations take place in A Unit 110 or P Unit 108 respectively.

In an ACCESS (P4) stage 210, the address of a read operand is generated and the memory operand, the address of which has been generated in a DAGEN Y operator with a Ymem indirect addressing mode, is then READ from indirectly addressed Y memory (Ymem).

The next stage of the pipeline is the READ (P5) stage 212 in which a memory operand, the address of which has been generated in a DAGEN X operator with an Xmem indirect addressing mode or in a DAGEN C operator with coefficient address mode, is READ. The address of the memory location to which the result of the instruction is to be written is generated.

Finally, there is an execution EXEC (P6) stage 214 in which the instruction is executed in either the A Unit 110 or the D Unit 112. The result is then stored in a data register or accumulator, or written to memory for Read/Modify/Write instructions. Additionally, shift operations are performed on data in accumulators during the EXEC stage.

Processor 100's pipeline is protected. This significantly improves the C compiler performance since no NOP's instructions have to be inserted to meet latency requirements. It also makes the code translation from a prior generation processor to a latter generation processor much easier.

A pipeline protection basic rule used in processor 100 is as follows: If a write access has been initiated before the on going read access but not yet completed and if both accesses share the same resource then extra cycles are inserted to allow the write completion and execute next instruction with the updated operands; but for emulation, a single step code execution must behave exactly as free running code execution.

The basic principle of operation for a pipeline processor will now be described with reference to FIG. 5. As can be seen from FIG. 5, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 5 for a seven stage pipeline a total of 7 instructions may be processed simultaneously. For all 7 instructions 302–314, FIG. 5 shows them all under process in time period $T_7$. Such a structure adds a form of parallelism to the processing of instructions.

Figure 6:
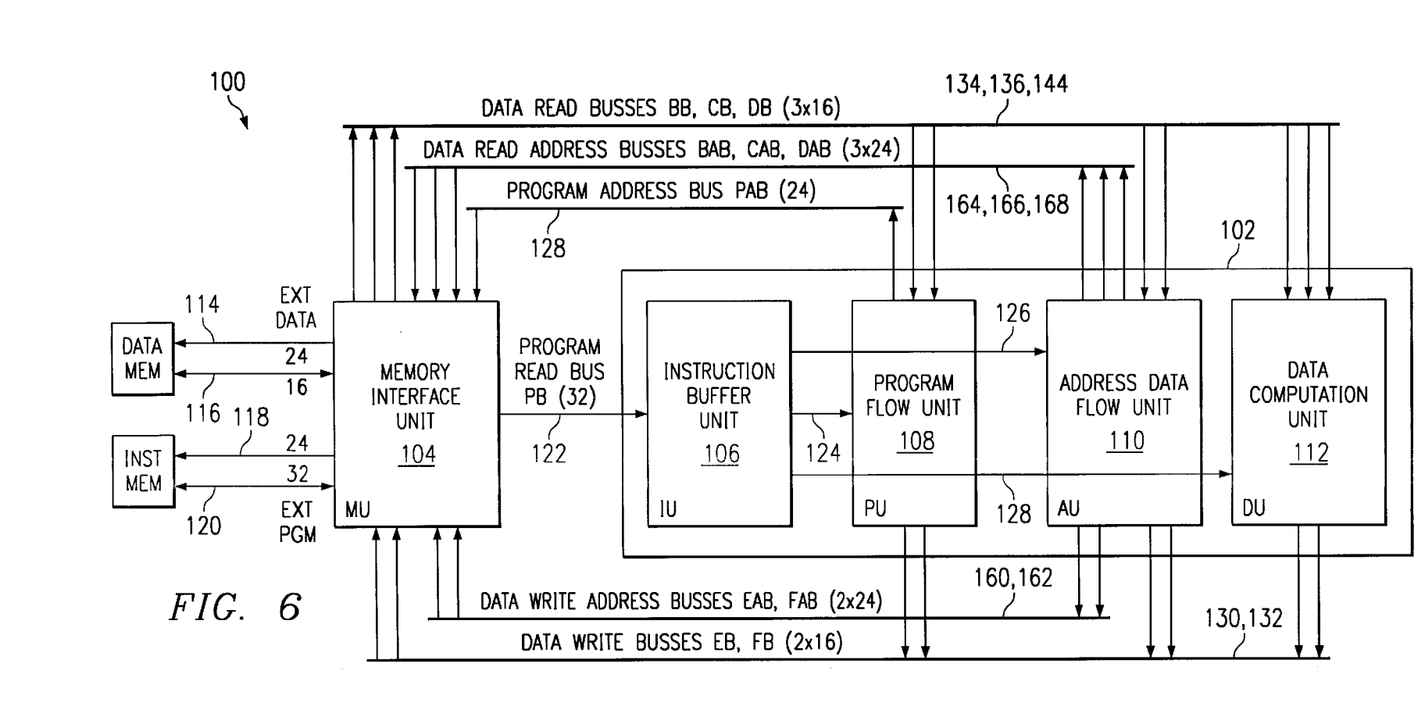
FIG. 6 is a block diagram of the processor illustrating a memory management unit interconnected memory.

As shown in FIG. 6, the present embodiment of the invention includes a memory interface unit 104 which is coupled to external program storage memory 150 via a 24 bit address bus 118 and a 32 bit bi-directional data bus 120.

Additionally, the memory interface unit 104 is coupled to data memory units 151 via a 24 bit address bus 114 and a bi-directional 16 bit data bus 116. The memory interface unit 104 is also coupled to the I Unit 106 of the machine processor core 102 via a 32 bit program read bus (PB) 122. The P Unit 108, A Unit 110 and D Unit 112 are coupled to the memory interface unit 104 via data read and data write buses and corresponding address buses. The P Unit 108 is further coupled to a program address bus 128.

More particularly, the P Unit 108 is coupled to the memory interface unit 104 by a 24 bit program address bus 128, the two 16 bit data write buses (EB, FB) 130, 132, and the two 16 bit data read buses (CB, DB) 134, 136. The A Unit 110 is coupled to the memory interface unit 104 via two 24 bit data write address buses (EAB, FAB) 160, 162, the two 16 bit data write buses (EB, FB) 130, 132, the three data read address buses (BAB, CAB, DAB) 164, 166, 168 and the two 16 bit data read buses (CB, DB) 134, 136. The D Unit 112 is coupled to the memory interface unit 104 via the two data write buses (EB, FB) 130, 132 and three data read buses (BB, CB, DB) 144, 134, 136.

FIG. 6 represents the passing of instructions from the I Unit 106 to the P Unit 108 at 124, for forwarding branch instructions for example. Additionally, FIG. 6 represents the passing of data from the I Unit 106 to the A Unit 110 and the D Unit 112 at 126 and 128 respectively.

Figure 7:
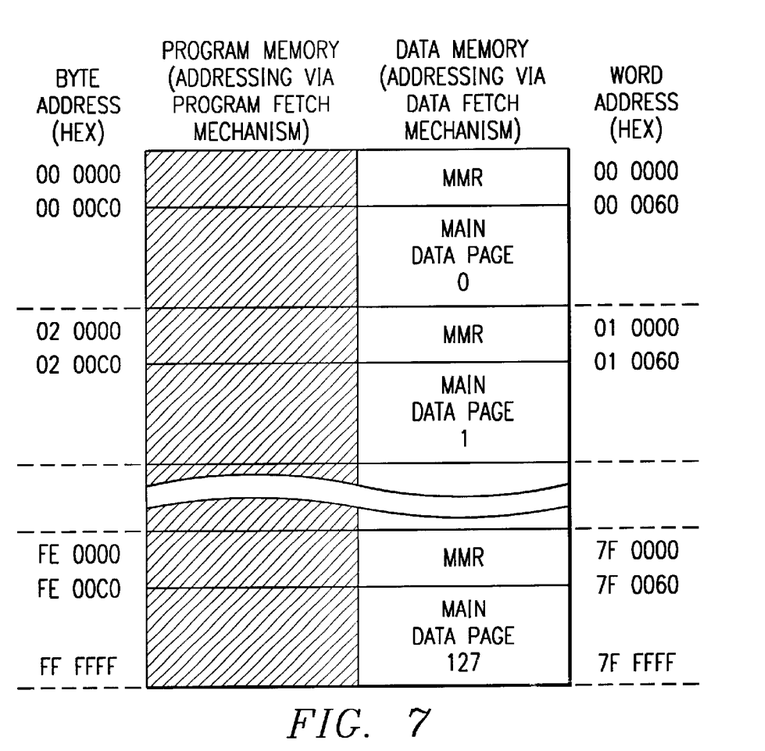
FIG. 7 shows the unified structure of Program and Data memory spaces of the processor.

Processor 100 is organized around a unified program/data space, as illustrated in FIG. 7. A program pointer is internally 24 bits and has byte addressing capability, but only a 22 bit address is exported to memory since program fetch is always performed on a 32 bit boundary. However, during emulation for software development, for example, the full 24 bit address is provided for hardware breakpoint implementation. Data pointers are 16 bit extended by a 7 bit main data page and have word addressing capability.

Software can define up to 3 main data pages, as follows:

| MDP | Direct access | Indirect access | CDP |
|---|---|---|---|
| MDP05 | — | Indirect access | AR[0–5] |
| MDP67 | — | Indirect access | AR[6–7] |

A stack is maintained and always resides on main data page 0. CPU memory mapped registers are visible from all the pages.

Various aspects of processor 100 are summarized in Table 2.

TABLE 2

Summary of Improved Processor 100
Very Low Power programmable processor
Parallel execution of instructions, 8-bit to 48-bit instruction format
Seven stage pipeline (including pre-fetch)

| | |
|---|---|
| Instruction buffer unit highlight | 32 × 16 buffer size Parallel Instruction dispatching Local Loop |
| Data computation unit highlight | Four 40 bit generic (accumulator) registers Single cycle 17 × 17 Multiplication-Accumulation (MAC) 40 bit ALU, "32 + 8" or "(2 × 16) + 8" Special processing hardware for Viterbi functions Barrel shifter |

TABLE 2-continued

Summary of Improved Processor 100
Very Low Power programmable processor
Parallel execution of instructions, 8-bit to 48-bit instruction format
Seven stage pipeline (including pre-fetch)

| | |
|---|---|
| Program flow unit highlight | 32 bits/cycle program fetch bandwidth |
| | 24 bit program address |
| | Hardware loop controllers |
| | (zero overhead loops) |
| | Interruptible repeat loop function |
| | Bit field test for conditional jump |
| | Reduced overhead for program flow control |
| Data flow unit highlight | Three address generators, with new addressing modes |
| | Three 7 bit main data page registers |
| | Two Index registers |
| | Eight 16 bit pointers |
| | Dedicated 16 bit coefficients pointer |
| | Four 16 bit generic registers |
| | Three independent circular buffers |
| | Pointers & registers swap |
| | 16 bits ALU with shift |
| Memory Interface highlight | Three 16 bit operands per cycle |
| | 32 bit program fetch per cycle |
| | Easy interface with cache memories |
| C compiler | |
| Algebraic assembler | |

According to aspects of the present invention, processor 100 enables execution of two instructions in parallel within the same cycle of execution, as was described with reference to FIG. 4. There are 2 types of parallelism:

1) 'Built-in' parallelism within a single instruction: Some instructions perform 2 different operations in parallel. The 'comma' is used to separate the two operations. This type of parallelism is also called 'implied' parallelism.

Example

Repeat(CSR), CSR+=#4; This instruction triggers a repeat single transaction and in parallel, CSR content is incremented by 4 in the A-unit ALU. This is a single processor instruction.

2) 'User-defined' parallelism between 2 instructions: Two instructions may be paralleled by the User, the C Compiler or the assembler optimizer by setting the parallel enable bit within one of the two instructions. The '||' separator is used to separate the 2 instructions to be executed in parallel by the processor device.

Example

AC1=(*AR1-)*(*AR2+); This 1st instruction performs a Multiplication in the D-unit.

||DR1=DR1^AR2; This 2nd instruction performs a logical operations in the A-unit ALU.

Implied parallelism can be combined with user-defined parallelism. Parenthesis separators can be used to determine boundaries of the 2 processor instructions.

Example (AC2=*AR3+* AC1, ; This is the 1st instruction,
DR3=(*AR3+)); which contains parallelism.
||AR1=#5 ; This is the 2nd instruction.

Referring again to FIG. 3, the main functionality of the A unit Data Address Generation Unit (DAGEN) is to compute the addresses of the data memory operands. Processor 100 has three data memory addressing modes:

1) Single data memory addressing with direct, indirect, or absolute options (Smem, dbl(Lmem))
2) Dual data memory addressing with an indirect address (Xmem, Ymem)
3) Coefficient data memory addressing (coeff)

A second usage of the A unit Data Address Generation Unit is to generate a bit position address used to manipulate bits within the processor CPU registers. In this case, no memory operand is accessed. This type of addressing is designated as (Direct, indirect) Register bit addressing (Baddr, pair(Baddr)).

The processor CPU registers are memory mapped. Therefore, a third usage of the A unit Data Address Generation Unit is to compute the data memory addresses of these CPU registers. This type of addressing is designated as (Direct, indirect, absolute) MMR addressing.

A fourth usage of the A unit Data Address Generation Unit is to compute the addresses of the I/O memory operands (peripheral registers or ASIC domain hardware). This type of addressing is designated as (Direct, indirect, absolute) single I/O memory addressing.

The last usage of the A unit Data Address Generation Unit is to compute the addresses of the data memory stack operands. This type of addressing is designated as single stack addressing and dual stack addressing.

As mentioned earlier, the processor's core CPU registers are memory mapped registers (MMR) in the 8 Mword memory space. The instructions set of processor 100 provides efficient means to access any register through instructions performing data memory accesses.

The Memory mapped registers (MMR) reside at the beginning of each main data pages between word addresses 0h and 05Fh, therefore, the MMRs' occupy only part of the local data pages 0 (DP=0h). Various MMRs of processor 100 are described in Table 3.

TABLE 3

Processor Core CPU Memory Mapped Registers
(mapped in each of the 128 Main Data Pages)

| processor MMR Register | Word Address (Hex) | processor Description (earlier processor description) | Bit Field |
|---|---|---|---|
| IMR0_L | 00 | Interrupt mask register IMR0 | [15-00] |
| IFR0_L | 01 | Interrupt flag register IFR0 | [15-00] |
| — | 02–05 | Reserved for test | |
| ST0_L | 06 | Status register ST0 | [15-00] |
| ST1_L | 07 | Status register ST1 | [15-00] |
| AC0_L | 08 | Accumulator AC0 | [15-00] |
| AC0_H | 09 | | [31-16] |
| AC0_G | 0A | | [39-32] |
| AC1_L | 0B | Accumulator AC1 | [15-00] |
| AC1_H | 0C | | [31-16] |
| AC1_G | 0D | | [39-32] |
| DR3_L | 0E | Data register DR3 | [15-00] |
| TRN0_L | 0F | Transition register TRN0 | [15-00] |
| AR0_L | 10 | Address register AR0 | [15-00] |
| AR1_L | 11 | Address register AR1 | [15-00] |
| AR2_L | 12 | Address register AR2 | [15-00] |
| AR3_L | 13 | Address register AR3 | [15-00] |
| AR4_L | 14 | Address register AR4 | [15-00] |
| AR5_L | 15 | Address register AR5 | [15-00] |
| AR6_L | 16 | Address register AR6 | [15-00] |
| AR7_L | 17 | Address register AR7 | [15-00] |
| SP_L | 18 | Data stack pointer SP | [15-00] |
| BK03_L | 19 | Circular buffer size register BK03 | [15-00] |
| BRC0_L | 1A | Block repeat counter register BRC0 | [15-00] |
| RSA0_L | 1B | Block repeat start address register RSA0 | [15-00] |
| REA0_L | 1C | Block repeat end address register REA0 | [15-00] |
| — | 1D | Processor mode status register PMST | [15-00] |

TABLE 3-continued

Processor Core CPU Memory Mapped Registers
(mapped in each of the 128 Main Data Pages)

| processor MMR Register | Word Address (Hex) | processor Description (earlier processor description) | Bit Field |
|---|---|---|---|
| — | 1E | Program Counter extension register | [07-00] |
| — | 1F | Reserved | |
| DR0_L | 20 | Data register DR0 | [15-00] |
| DR1_L | 21 | Data register DR1 | [15-00] |
| DR2_L | 22 | Data register DR2 | [15-00] |
| DR3_L | 23 | Data register DR3 | [15-00] |
| AC2_L | 24 | Accumulator AC2 | [39-32] |
| AC2_H | 25 | | [31-16] |
| AC2_G | 26 | | [15-00] |
| CDP_L | 27 | Coefficient data pointer CDP | [15-00] |
| AC3_L | 28 | Accumulator AC3 | [39-32] |
| AC3_H | 29 | | [31-16] |
| AC3_G | 2A | | [15-00] |
| MDP_L | 2B | Main data page register MDP | [06-00] |
| MDP05_L | 2C | Main data page register MDP05 | [06-00] |
| MDP67_L | 2D | Main data page register MDP67 | [06-00] |
| DP_L | 2E | Local data page register DP | [15-00] |
| PDP_L | 2F | Peripheral data page register PDP | [15-00] |
| BK47_L | 30 | Circular buffer size register BK47 | [15-00] |
| BKC_L | 31 | Circular buffer size register BKC | [15-00] |
| BOF01_L | 32 | Circular buffer offset register BOF01 | [15-00] |
| BOF23_L | 33 | Circular buffer offset register BOF23 | [15-00] |
| BOF45_L | 34 | Circular buffer offset register BOF45 | [15-00] |
| BOF67_L | 35 | Circular buffer offset register BOF67 | [15-00] |
| BOFC_L | 36 | Circular buffer offset register BOFC | [15-00] |
| ST3_L | 37 | System control register ST3 | [15-00] |
| TRN1_L | 38 | Transition register TRN1 | [15-00] |
| BRC1_L | 39 | Block repeat counter register BRC1 | [15-00] |
| BRS1_L | 3A | Block repeat save register BRS1 | [15-00] |
| CSR_L | 3B | Computed single repeat register CSR | [15-00] |
| RSA0_H | 3C | Repeat start address register RSA0 | [23-16] |
| RSA0_L | 3D | | [15-00] |
| REA0_H | 3E | Repeat end address register REA0 | [23-16] |
| REA0_L | 3F | | [15-00] |
| RSA1_H | 40 | Repeat start address register RSA1 | [23–16] |
| RSA1_L | 41 | | [15-00] |
| REA1_H | 42 | Repeat end address register REA1 | [23-16] |
| REA1_L | 43 | | [15-00] |
| RPTC_L | 44 | Single repeat counter register RPTC | [15-00] |
| IMR1_L | 45 | Interrupt mask register IMR1 | [07-00] |
| IFR1_L | 46 | Interrupt flag register IFR1 | [07-00] |
| DBIER0_L | 47 | Debug interrupt register DBIER0 | [15-00] |
| DBIER1_L | 48 | Debug interrupt register DBIER1 | [07-00] |
| IVPD_L | 49 | Interrupt vector pointer for DSP IVPD | [15-00] |
| IVPH_L | 4A | Interrupt vector pointer for HOST IVPH | [15-00] |
| SSP_L | 4B | System stack pointer SSP | [15-00] |
| ST2_L | 4C | Pointer configuration register ST2 | [08-00] |
| — | 4D–5F | Reserved | |

Various aspects of single data memory operand addressing will now be described in more detail. Single data memory operand addressing uses the following assembler mnemonics: Smem, dbl(Lmem). Direct, indirect and absolute addressing can be used in instructions having a single data memory operand. According to the type of the accessed data, the single data memory addressing is designated in instructions as described in Table 4.

TABLE 4

Single Data Memory Operand Addressing

| | |
|---|---|
| Byte memory operands | high_byte(Smem), low_byte(Smem) |
| Word memory operand | Smem |
| Long word memory operand | dbl(Lmem) or Lmem |

In following examples, examples 1 and 2 illustrate instructions that load a byte and that load a word, respectively, in the accumulator, data or address registers. Example 3 shows the instruction that loads a long word in an accumulator register. The last example is the instruction that loads two adjacent data or address registers (DAx) with two 16-bit values extracted from the long word memory operand.

Examples 1) dst=low_byte(Bmem)

2) dst=Smem

3) ACx=dbl(Lmem)

4) pair(DAx)=Lmem

Figure 8:
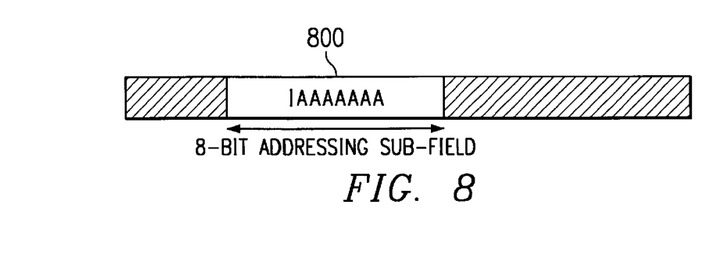
FIG. 8 illustrates a single data memory operand instruction format.

FIG. 8 illustrates a single data memory operand instruction format. Single data memory operand instructions have an instruction format embedding an 8-bit sub-field 800 used by the Data Address Generation Unit (DAGEN) to generate the data memory address.

Byte memory operands and word memory operands of the single data memory operand instructions (see Table 5) are accessed through the following buses in processor 100:

DB bus for read memory operands

EB bus for write memory operands when no preliminary shift occurs within the D-unit shifter FB bus for write memory operands when a preliminary shift occurs within the D-unit shifter

TABLE 5

Processor Instructions Making a Shift,
Rounding and Saturation Before Storing to Memory

| | |
|---|---|
| Smem = HI(rnd(ACx)) | Smem = LO(ACx << DRx) |
| Smem = HI(saturate(rnd(ACx))) | Smem = LO(ACx << SHIFTW) |
| Smem = HI(rnd(ACx << DRx)) | Smem = HI(ACx << SHIFTW) |
| Smem = HI(saturate(rnd (ACx << DRx))) | Smem = HI(rnd(ACx << SHIFTW)) |
| | Smem = HI(saturate(rnd (ACx << SHIFTW))) |

Figure 9:
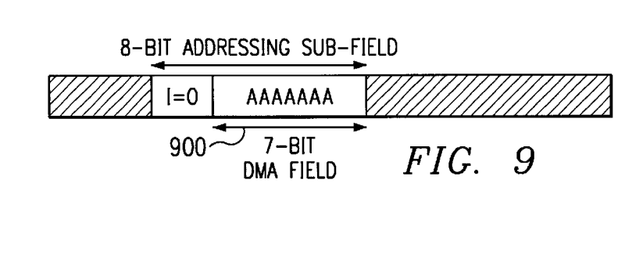
FIG. 9 illustrates an addresses field for a 7-bit positive offset dma address in the addressing field of the instruction.

Long word memory operands are accessed through the following buses in processor 100:

CB (for most significant word—MSW) and DB (for least significant word—LSW) buses for read memory operands FB (for MSW) and EB (for LSW) bus for write memory operands FIG. 9 illustrates an addresses field for a 7-bit positive offset direct memory address 900 in the addressing field of the instruction. Direct memory addressing (dma) mode allows a direct memory access relative either to the local data page pointer (DP) or to the data stack pointer (SP) registers. The type of relative addressing is controlled by the CPL status bit. When CPL=0, direct memory addressing is relative to DP. When CPL=1, direct memory addressing is relative to SP.

As shown in Table 6, the computation of the 23-bit word address does not depend on the type of the accessed memory operand. For byte, word or long word memory accesses a 7-bit positive offset (called dma) is added to the 16 bits of DP or SP. The 16-bit result of the addition is concatenated to one of the following:

1. If CPL=0, the 7-bit main data page pointer MDP

2. If CPL=1, a 7-bit field cleared to 0 (the stack must be implemented in main data page 0).

TABLE 6

Smem, dbl(Lmem) Direct Memory Addressing (dma)

| Assembly syntax | Generated address | Comments |
|---|---|---|
| @dma | MDP • (DP + dma) | Smem, Lmem accesses in application mode (CPL = 0) |
| *SP(dma) | MDP • (SP + dma) | Smem, Lmem accesses in compiler mode (CPL = 1) | note: this symbol indicates a concatenation operation between a 7-bit field and a 16-bit field: •

The 7-bit positive offset dma ranges within [0, 127] interval and it is encoded within a 7-bit field 900 in the addressing field of the instruction (see FIG. 9).

As a result, the dma mode allows access to byte, words and long words included in a 128-word DP or SP frame.

Indirect memory addressing mode allows the computation of the addresses of the data memory operands from the content of the eight address registers AR[0-7] or from the content of the coefficient data pointer CDP.

Whenever such memory access is performed, the selected pointer register can be modified before or after the address has been generated. Pre-modifiers will modify the content of the register before generating the memory operand address. Post-modifiers will modify the content of the register after generating the memory operand address.

The set of modifiers applied to the pointer register depends on the ARMS status bit. When ARMS=0, a set of modifiers enabling efficient execution of DSP intensive applications are available for indirect memory accesses. This set of modifiers is called 'DSP mode' modifiers. When ARMS=1, a set of modifiers enabling optimized code size of control code is available for indirect memory accesses. This set of modifiers is called 'Control mode' modifiers.

The modifiers applied to the selected pointer register can be controlled by a circular management mechanism to implement circular buffers in data memory. The circular management mechanism is controlled by following resources:

The status register ST2, where each pointer register can be configured in circular or in linear mode
  The three 16-bit buffer size registers BK03, BK47, and BKC where the size of the circular buffers to implement can be determined
  The five 16-bit buffer offset registers BOF01, BOF23, BOF45, BOF67 and BOFC which allow circular buffer start addresses unbounded to any alignment constraints In all cases, whether circular addressing is activated or not, the 23-bit generated address is computed by performing a pre-modification on the 16-bit selected pointer (ARx or CDP). This 16-bit result is concatenated with one of the 7-bit main data page pointers, as follows:

1. MDP05, when indirect memory addressing is done with AR0, AR1, AR2, AR3, AR4 or AR5 address registers.
2. MDP67, when indirect memory addressing is done with AR6 or AR7.
3. MDP, when indirect memory addressing is done with CDP.

Two absolute memory addressing modes, designated as *abs16(#k) and *(#k), exists on the processor (see Table 7). The first absolute addressing mode is MDP referenced addressing: a 16-bit constant representing a word address is concatenated to the 7-bit main data page pointer MDP to generate a 23-bit word memory address. This address is passed by the instruction through a two byte extension added to the instruction. The second absolute addressing mode allows addressing of the entire 8M word of data memory with a constant representing a 23-bit word address. This address is passed by the instruction through a three byte extension added to the instruction (the most significant bits of this three byte extension are discarded). Instructions using these addressing modes can not be paralleled.

TABLE 7

Smem, dbl(Lmem) Absolute Data Memory Addressing Modes

| Assembly syntax | Generated address | Comments |
|---|---|---|
| *abs16(#k16) | MDP • k16 | Smem, dbl(Lmem) access |
| *(#k23) | k23 | Smem, dbl(Lmem) access |

Note: This symbol indicates a concatenation operation between a 7-bit field and a 16-bit field: •

Indirect dual data memory addressing mode, designated by (Xmem, Ymem), allows two memory accesses through the 8 AR[0-7] address registers. This addressing mode may be used when executing an instruction making two 16-bit memory accesses or when executing two instructions in parallel. In the former case, the two data memory operands are designated in instructions with the Xmem and Ymem keywords. In the latter case, each instruction must use an indirect single data memory address (Smem, dbl(Lmem)). The first instruction's data memory operand is treated as the Xmem operand, and the second instruction's data memory operand is treated as the Ymem operand. These type of dual accesses are designated 'software' indirect dual accesses.

Example 1 below demonstrates the instruction to add two 16-bit memory operands and store the result in a designated accumulator register. Example 2 shows two single data memory addressing instructions which may be paralleled if the above rules are respected.

Examples

1. ACx=(Xmem<<#16)+(Ymem<<#16)
2. dst=Smem|| dst=src and Smem

Xmem operands are accessed through the DB bus for read memory operands and the EB bus for write memory operands. Ymem operands are accessed through the CB bus for read memory operands and the FB bus for write memory operands.

Indirect dual data memory addressing modes have the same properties as indirect single data memory addressing modes (see previous section). Indirect memory addressing accesses through the ARx address registers are performed within the main data pages selected by MDP05 and MPD67 registers. Indirect memory addressing accesses through the ARx address registers can address circular memory buffers when the buffer offset registers BOFxx, the buffer size register BKxx, and the pointer configuration register ST2 are appropriately initialized (see previous section). However, the ARMS status bit does not configure the set of modifiers available for the indirect dual data memory addressing modes.

Coefficient data memory addressing, designated by (Coeff), allows memory read accesses through the coefficient data pointer register CDP. This mode has the same properties as indirect single data memory addressing mode. Indirect memory addressing accesses through the CDP pointer register are performed within the main data page selected by MDP register. Indirect memory addressing accesses through the CDP address registers can address circular memory buffers.

Instructions using the coefficient memory addressing mode to access a memory operand mainly perform operations with three memory operands per cycle. Two of these operands, Xmem and Ymem, can be accessed with the indirect dual data memory addressing modes. The third operand is accessed with the coefficient data memory addressing mode. This mode is designated in the instruction with the 'coeff' keyword.

The following instruction example illustrates this addressing scheme. In one cycle, two multiplications can be performed in parallel in the D-unit dual MAC operator. One memory operand is common to both multipliers (coeff), while indirect dual data memory addressing accesses the two other data (Xmem and Ymem).

ACx=sat40(rnd(uns(Xmem)*uns(coeff))), sat40(rnd(uns(Ymem)*uns(coeff)))

Coeff operands are accessed through the BB bus. To access three read memory operands (as in the above example) in one cycle, the coeff operand should be located in a different memory bank than the Xmem and Ymem operands.

The processor CPU core takes advantage of the Data Address Generation Unit (DAGEN) features to provide an efficient means to address a bit within a CPU register. In this case, no memory access is performed. Direct and indirect register bit addressing mode can be used in instructions performing bit manipulation on the processor core CPU address, data and accumulator registers. Register bit addressing will be designated in instructions with the 'Baddr' keyword. Five bit manipulation instructions, shown in the examples below, use this addressing mode. The last instruction example causes a single register bit address to be generated by the DAGEN unit while two consecutive bits are tested within the 'src' register:

TCx=bit(src, Baddr)

cbit(src, Baddr)

bit(src, Baddr)=#0 bit(src, Baddr)=#1 bit(src, pair(Baddr))

Accessing memory mapped registers within processor 100 will now be described in more detail. As described in an earlier section with respect to Table 3, the processor CPU registers are memory mapped at the beginning of each 64 K main data page between addresses 0h and 05Fh. This means that any single data memory addressing mode (Smem, dbl(Lmem)) can be used to access the processor MMR registers.

Direct data memory addressing (dma) can be used. In this case, the user must ensure that processor is in application mode (CPL status bit is set 0) and the local data page pointer register is reset to 0. Then, the user can use the MMR register symbol to direct the assembler to define the dma field of single data memory operand instructions to access these registers.

Example

1. DP=#0 ; set DP to 0
2. DP 0 ; assembler directive to indicate DP value 0
3. bit(ST1, #CPL)=#0 ; set CPL to 0
4. AC1=uns(@ACO_L); make a dma access to address ACO_L MMR register.

Indirect data memory addressing can be used. In this case, the user must ensure that the pointer register used is appropriately initialized to point to the selected MMR register. The addresses of these MMR registers are given in Table 3. The ARMS, the FAMILY status bits and the ST2, BOFxx, BKxx, MDPxx, and DRx registers should be initialized for an indirect single data memory access (Smem, dbl(Lmem)).

Example

1. AR1=#ACO_L; initialize AR1 so that it points to ACO_L
2. AC1=uns(*AR1); make an indirect access to address of ACO_L MMR register.

Absolute data memory addressing can be used. In this case, the addresses of the MMR registers (see Table 3) can be used to access the selected MMR.

Example

AC1=*(#AC0_L); make an absolute access to address of ACO_L MMR register.

The first scheme has the disadvantage of forcing the user to reset the local data page pointer and the CPL to 0 before making the MMR access. The third scheme has the disadvantage of extending the single data memory operand instruction with a two byte extension word.

Figure 10:
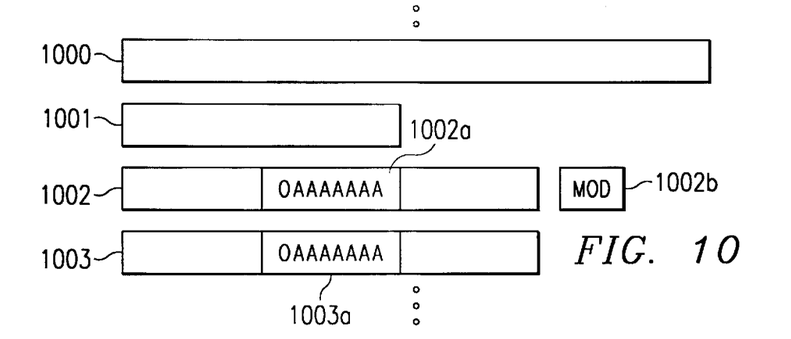
FIG. 10 illustrates a means for modifying the operation of a generic memory access instruction.

FIG. 10 illustrates a means for modifying the operation of a generic memory access instruction, as described above and with reference to FIGS. 8–9, by appending an instruction qualifier, according to an aspect of the present invention. A sequence of variable length instructions 1000–1004 is representative of a program executed by processor 100. Instruction 1002 is a generic memory access instruction, which has associated with it an instruction qualifier 1002b, according to aspects of the present invention. Advantageously, an improved MMR addressing mode is provided which uses an instruction qualifier, designated as mmap( ), in parallel with instructions making a direct memory address (dma) access. Mmap( ) instruction qualifier 1002b is decoded in instruction unit 106 in a combined manner in conjunction with an associated memory access instruction 1002 using implied parallelism, as described earlier. The mmap( ) qualifier configures the DAGEN unit such that for the execution of the paralleled instructions the following occurs:

CPL is masked to 0.

DP is masked to 0.

MDP is masked to 0.

Example

AC1=@(ACO_L)|| mmap( ); make an MMR access to ACO_L register.

These settings will enable access to the 128 first words of the 8M words of data memory using address field 1002a, which corresponds to the MMR registers. Instruction 1003 is the same instruction as instruction 1002, with the same contents in address field 1003a. However, since instruction 1003 is not associated with an instruction qualifier instruction, instruction 1003 accesses a data value from data memory 151 using address 1003a in one of the address modes discussed previously.

Advantageously, by using the mmap( ) instruction qualifier, processor 100 can determine that an access is being made to a MMR, rather than to bulk memory during the decode stage of the instruction pipeline. Therefore, the buses connected to memory can be released for use by other resources during the access cycle of the qualified instruction. If an address decode had to be done to determine that a MMR is being accessed, then the unneeded memory buses could not be released for other use.

Some restrictions apply to all of the MMR addressing modes described earlier in this embodiment. Instructions loading or storing bytes and instructions making a shift operation before storing to memory cannot access the MMRs (see Table 8). In an alternate embodiment, these restrictions may be removed.

TABLE 8

Processor Instructions Which Do Not Allow MMR Accesses

| | |
|---|---|
| dst = uns(high_byte(Smem)) | high_byte(Smem) = src |
| dst = uns(low_byte(Smem)) | low_byte(Smem) = src |
| ACx = high_byte(Smem) << SHIFTW | |
| ACx = low_byte(Smem) << SHIFTW | |
| Smem = HI(rnd(ACx)) | Smem = LO(ACx << DRx) |
| Smem = HI(saturate(rnd(ACx))) | Smem = LO(ACx << SHIFTW) |
| Smem = HI(rnd(ACx << DRx)) | Smem = HI(ACx << SHIFTW) |
| Smem = HI(saturate(rnd (ACx << DRx))) | Smem = HI(rnd (ACx << SHIFTW)) |
| | Smem = HI(saturate(rnd (ACx << SHIFTW))) |

I/O Memory Addressing Modes will now be described. As described in a previous section, peripheral registers or ASIC domain hardware are memory mapped in a 64 K word I/O memory space. The efficient DAGEN unit operators can be used to address this memory space. Referring again to FIGS. 1 and 6, all instructions having a single data memory operand (Smem) can be used to access the peripheral 26 via memory management unit 104 through the DAB and EAB buses.

Advantageously, according to an aspect of the present invention, an improved I/O space addressing mode is provided which uses an instruction qualifier, designated as readport( ) or writeport( ), in parallel with instructions making a direct memory address (dma) access. These instruction qualifiers can be used in parallel with a single data memory operand instruction to re-direct the memory access from the data space to the I/O space.

When the readport( ) qualifier is used, all Smem read operands of instructions will be re-directed to the I/O space. The first example below illustrates a word data memory read access. The second example demonstrates a word I/O memory read access.

1) dst=Smem 2) dst=Smem|| readport( )

In this embodiment, it is illegal to apply this qualifier to instructions with an Smem write operand.

When the writeport( ) qualifier is used, all Smem write operands of instructions will be re-directed to the I/O space. The first example below illustrates a word data memory write access. The second example demonstrates a word I/O memory write access.

1) Smem=dst

2) Smem=dst writeport( )

In this embodiment, it is illegal to apply this qualifier to instructions with an Smem read operand.

As has been explained in an earlier section, single data memory addressing can be direct data memory addressing (dma). This data memory addressing mode, if modified by the paralleled readport( )/writeport( ) qualifier, becomes a direct I/O memory addressing mode. The 7-bit positive offset dma encoded within the addressing field of the instruction is concatenated to the 9-bit peripheral data page pointer PDP. The resulting 16-bit word address is used to address the I/O space. This addressing mode allows definition of 128-word peripheral data pages within the I/O memory space. The data page start addresses are aligned on a 128-bit word boundary. Also, 512-word peripheral data pages can be defined within the I/O memory space. It is important to note that byte operand read and write can be handled through this mechanism and the CPL status bit does not impact this addressing mode.

As has been explained in a previous section, single data memory addressing can be indirect data memory addressing. This data memory addressing mode, if modified by the paralleled readport( )/writeport( ) qualifier, becomes an indirect I/O memory addressing mode. The indirect data memory address generated by the address generation unit is used to address the I/O space. Note that since the peripheral space is limited to a 64 K word space, the DAGEN unit computes only a 16-bit word address; concatenation with MDPxx registers does not occur. In this case, the user must ensure that the pointer registers ARx and CDP used to for the addressing are appropriately initialized to point to the selected I/O memory location. For any of these accesses, the ARMS, the FAMILY status bits, and ST2, BOFxx, BKxx, and DRx registers should be initialized for indirect single data memory access. It is important to note that byte operand read and write can be handled through this mechanism and MDPxx register contents do not impact this addressing mode.

The I/O memory space can also be addressed with an absolute I/O addressing mode (see Table 9). Single data memory addressing Smem operand instructions may use this mode to address the entire 64 K words of I/O memory. A 16-bit word address is a constant passed by the instruction through a two byte extension added to the instruction. Instructions using these addressing modes to access I/O memory operand can not be paralleled.

TABLE 9

Absolute I/O Memory Addressing Mode

| Assembly Syntax | Generated Address | Comments |
|---|---|---|
| *port(#K16) | k16 | Smem, access |

In this embodiment, some restrictions apply to all of the I/O memory addressing modes described in previous sections. Instructions making a shift operation before storing to memory cannot access the I/O memory space locations (see Table 10).

TABLE 10

Processor Instructions Which Do Not Allow I/O Accesses

| | |
|---|---|
| Smem = HI(rnd(ACx)) | Smem = LO(ACx << DRx) |
| Smem = HI(saturate(rnd(ACx))) | Smem = LO(ACx << SHIFTW) |
| Smem = HI(rnd(ACx << DRx)) | Smem = HI(ACx << SHIFTW) |
| Smem = HI(saturate(rnd (ACx << DRx))) | Smem = HI(rnd(ACx << SHIFTW)) |
| | Smem = HI(saturate(rnd (ACx << SHIFTW))) |

A port qualifier can also be associated with a bit manipulation instruction. Being able to set/clear a peripheral from a single instruction allows implementation of semaphores in I/O space. The instruction set of processor 100 provides an atomic Test & Set instruction which points by default to memory. By executing in parallel the readport( ) byte qualifier the Test & Set is performed on the I/O space. The CPU core 102 exports a LOCK signal, which prevents external semaphore access in between processor 100's read slot and processor 100's write slot. In case of readport( ) qualification, a Peripheral Lock is generated on bus 22 instead of a Memory Lock.

Dual instructions which read and write to two different (or the same) addresses can be qualified by readport( ) or writeport( ). This provides an efficient way to move a set of variables from peripheral to memory, for example. Using a single dual instruction and single repeat instruction, a block of data can be moved between memory and I/O space without a temporary register. This can be useful for context switch, peripheral initialization, etc. If a dual instruction which performs Ymem=Xmem is paralleled with a readport( ) qualifier, then a peripheral read and a memory write will result. Conversely, if the dual instruction is paralleled with a writeport( ) qualifier, then a memory read and peripheral write will result.

The process of performing a context save in response to an interrupt, or other instruction stream discontinuity, can be optimized using the memory map qualifier. CPU registers can be saved and restored by using the instructions in Table 11:

TABLE 11

| SAVE | RESTORE |
|---|---|
| Push(ACx) | ACx = pop( ) |
| Push(DAx) | DAx = pop( ) |
| Push(src1,src2) | dst1 ,dst2 = pop( ) |
| Push(src,Smem) | dst,Smem = pop( ) |
| dbl(push(ACx)) | dbl(ACx) = pop( ) |

However, because the CPU registers and peripheral registers are memory mapped, the instructions illustrated in Table 12 can be advantageously used to transfer these registers to and from the stack:

TABLE 12

| | SAVE | RESTORE |
|---|---|---|
| Direct access | push(Smem) ‖ mmap( ) | Smem = pop( ) ‖ mmap( ) |
| | push(dbl(Lmem)) ‖ mmap( ) | dbl(Lmem) = pop( ) ‖ mmap( ) |
| | push(src,Smem) ‖ mmap( ) | dst,Smem = pop( ) ‖ mmap( ) |
| | push(Smem) ‖ readport( ) | Smem = pop( ) ‖ writeport( ) |
| | push(src,Smem) ‖ readport( ) | dst,Smem = pop( ) ‖ writeport( ) |
| Indirect access | push(Smem) | Smem = pop( ) |
| | push(dbl(Lmem)) | dbl(Lmem) = pop( ) |
| | push(src,Smem) | dst,Smem = pop( ) |
| | push(Smem) ‖ readport( ) | Smem = pop( ) ‖ writeport( ) |
| | push(src,Smem) ‖ readport( ) | dst,Smem = pop ( ) ‖ writeport( ) |

Figure 11:
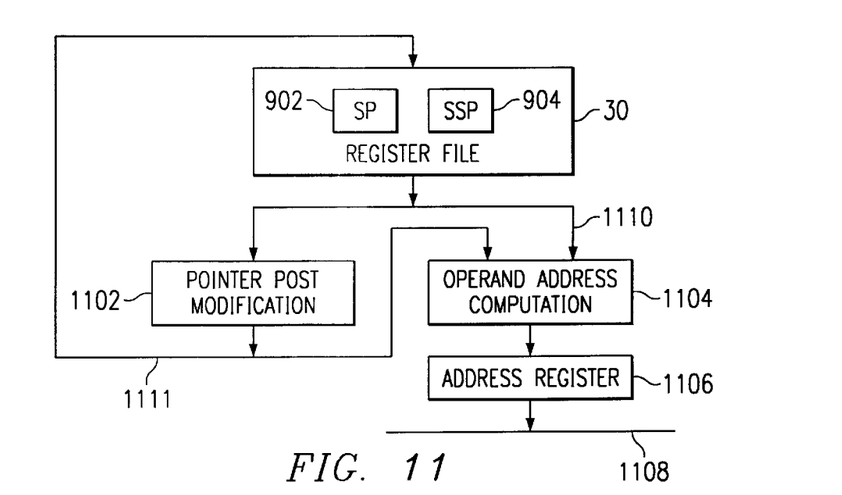
FIG. 11 is a block diagram illustrating address generation in the microprocessor.

FIG. 11 is a block diagram illustrating address generation in the microprocessor of FIG. 1. Register file 30 holds various registers for microprocessor 100, including user stack pointer 902 and system stack pointer 904. Pointer post modification circuitry 1102 is connected to the register file via bus 1110 and is operable to increment or decrement a selected register by a selected amount. A modified register value is provided to operand address computation circuitry 1104 via bus 1111. Operand address computation circuitry 1104 is operable to modify the value of a selected register in response to the addressing mode of an instruction being executed, such as by adding a stack pointer relative address to the stack pointer, as described earlier. An appropriately modified address value is then stored in address register circuitry 1106 and applied to address bus 1108 in order to access memory. Address bus 1108 is representative of any of address busses 160, 162, 164, 166 or 168 of FIG. 6. The A unit supports 16 bit operations and 8 bit load/store. Most of the address computation is performed by the DAGEN thanks to powerful modifiers. All the pointer registers and associated offset registers are implemented as 16 bit registers. The 16 bit address is then concatenated to the main data page to build a 24 bit memory address.

Figure 12:
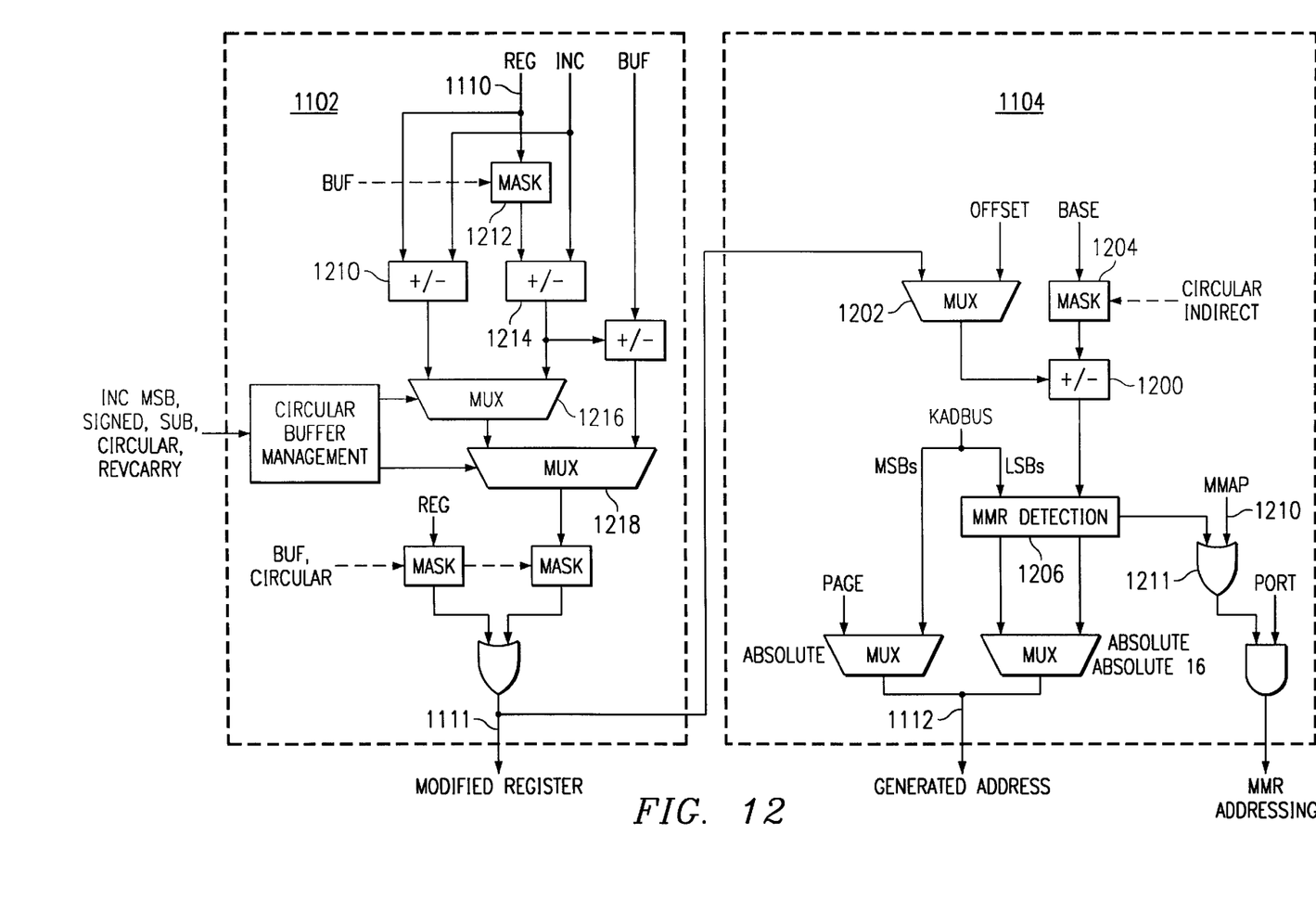
FIG. 12 is a more detailed block diagram of portions of the address generation circuitry of FIG. 11.

FIG. 12 is a more detailed block diagram of portions of the address circuitry of FIG. 11. Address generation is made by computing logical and arithmetical operations (masking, additions and subtractions with or without reverse carry propagation). Selection of the operands is done in the Register File. Address generation is performed in two stages: register modification is performed in modification circuitry 1102, and offset computation is performed in computation circuitry 1104. Direct and absolute addressing don't use register modification (in these cases, register modification result is ignored) Register modification is controlled by the signals described in Table 13, while Offset modification is controlled by the signals described in Table 14.

TABLE 13

Register Modification Control Signals

| | |
|---|---|
| sub | modifier requires a post- or re-decrementation of the register. |
| revcarry | modifier implies a reverse propagated carry operation. |
| circular | register modification should be done circularly. |

TABLE 14

Offset Modification Control Signals

| | |
|---|---|
| Indirect | if LOW, address computation doesn't make use of ARx or modified ARx. |
| absolute24 | address is based on a constant, without use of MDP as a page index. |
| absolute | address is based on a constant, with use of MDP as a page index. |
| pm | address is based on the pre-modified register, computed as described earlier. |
| readport/writeport | address is targeted towards peripherals: offset used is PDP, with no paging. |
| mmap | address is targeted towards MMRs (when in direct addressing, for X and Y paths only) |

X, Y and Coefficient paths are very similar. However, the coefficient path is much simpler, since it only supports indirect addressing with a limited set of modifiers (no pre-modify).

Referring still to FIG. 12, operand address computation circuitry 1104 includes adder/subtractor unit 1200 for pre-incrementing/decrementing a register value. Mux 1202 can provide a modified register value via bus 1111 to a first input of adder 1200. Mux 1202 can also provide an offset value from an instruction to the first input of adder 1200. Masker 1204 is connected to a second input of adder 1200 and can select one of the registers from register file. A computed address is examined to determine if it points to a MMR in detection circuitry 1206, and then sent to an address register via bus 1112. According to an aspect of the present invention, mmap signal 1210 is asserted when a mmap( ) qualifier is decoded and sent to gate 1211 to enable MMR addressing.

Still referring to FIG. 12, modification circuitry 1102 receives a register value from register file 30 via bus 1110. The register value can be incremented or decremented by adder/subtractor 1210 or masked by masker circuitry 1212 and then incremented/decremented by adder/subtractor 1214. Multiplexors 1216 and 1218 route the modified value to bus 1111 for updating the register file 30 and for sending to address computation circuitry 1104.

Figure 13:
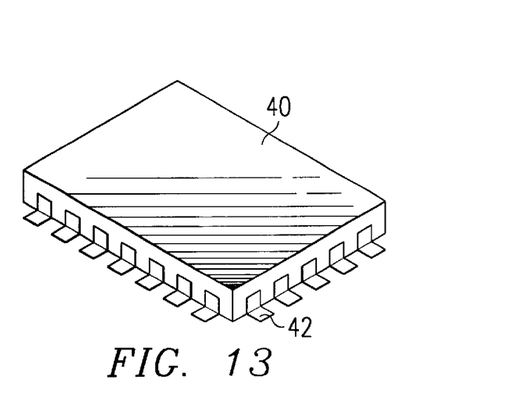
FIG. 13 is a schematic representation of an integrated circuit incorporating the processor.

FIG. 13 is a schematic representation of an integrated circuit incorporating processor 100. As shown, the integrated circuit includes a plurality of contacts for surface mounting. However, the integrated circuit could include other configurations, for example a plurality of pins on a lower surface of the circuit for mounting in a zero insertion force socket, or indeed any other suitable configuration.

Figure 14:
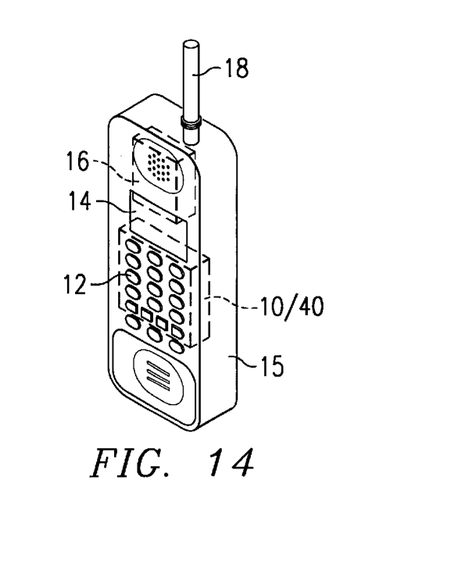
FIG. 14 is a schematic representation of a telecommunications device incorporating the processor of FIG. 1.

FIG. 14 illustrates a exemplary implementation of an example of such an integrated circuit in a mobile telecommunications device, 15 such as a mobile telephone with integrated keyboard 12 and display 14. As shown in FIG. 14, the digital system 10 with processor 100 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

Thus, there has been described a processor that is a programmable digital signal processor (DSP), offering both high code density and easy programming. Architecture and instruction set are optimized for low power consumption and high efficiency execution of DSP algorithms, such as for wireless telephones, as well as pure control tasks. The processor includes an instruction buffer unit, and a data computation unit for executing the instructions decoded by the instruction buffer unit. Instructions can be executed in a parallel manner, either in response to implicit parallelism or in response to user defined parallelism. An instruction qualifier can be coupled with an instruction and executed in parallel with the instruction in response to implied parallelism. The instruction qualifier can therefore interact with the operation of the instruction to modify the operation of the qualified instruction.

Processor 100 takes advantage of the parallelism and variable length instructions to provide an efficient handling of peripheral registers or CPU memory mapped registers. The instructions set provides three memory instructions qualifiers to access the core registers and external registers (peripherals of ASIC domain hardware) as memory mapped registers. Processor 100 has no specific memory mapped register or peripheral register instructions, but instead an 8-bit qualifier instruction is executed in parallel with the generic memory instruction. This provides to the user a quite powerful interfacing with the application dedicated hardware since the full memory instruction set is then available to handle dedicated hardware resources.

Advantageously, a memory mapped qualifier, mmap( ), can alter the operation of a memory access instruction so that a memory mapped register is accessed, instead of memory. Likewise, a readport qualifier, readport( ), or a writeport qualifier writeport( ), can alter the operation of a memory access instruction so that a peripheral device is accessed, instead of memory.

The core registers of processor 100 can be accessed as memory mapped registers with no wait state. The local page 0 is selected regardless of the content of the Data Page register. The mmap( ) qualifier is only valid for direct memory access. The memory mapped registers can be also accessed by indirect addressing or by setting the page 0 without the mmap( ) qualifier. A pair of registers can be accessed per cycle if the generic memory instruction is defined as a long word instruction dbl(Lmem). This will pack high and low words of a 32 bit accumulator. In this case the address is always pointing to the most significant word. Double push into stack is supported via the parallel mmap( ) qualifier. Dual access and byte access are not supported.

I/O devices can be accessed using generic memory access instructions that are qualified with a port qualifier: readport ( ), writeport( ). I/O space (64 Kwords) is selected. The access requires at least two cycles. Extra slots may be required by the custom hardware or by configuration. Only single word and byte accesses are supported. This restriction is driven from bus routing within processor 100 and not from the access qualification scheme. Therefore, other embodiments may have different restrictions. The Peripheral Data Page PDP[15-8] is selected instead of the Memory Data Page DP[15-0] when a direct memory access instruction is qualified by the readport( ) or writeport( ) tag regardless of the compiler mode bit (CPL). This scheme provides the flexibility to handle independently memory variables and peripherals interfacing. The peripheral frame is always aligned on 128 words boundary.

Another embodiment may have a set of memory mapped registers with memory addresses that do not overlay the memory address of data memory or instruction memory.

Other types of instruction qualifiers may be embodied which affect a generic instruction in different ways, such as to specify a data type, to select an execution site or resource, or to determine types of status reporting, for example. Another embodiment may have other addressing modes which can be modified by means of an instruction qualifier.

Implementing peripherals in independent I/O space maximizes both data memory addressing space & peripheral data space. In case of processor 100, 64 K words are provided to map dedicated hardware. Other embodiments could provide different sized address spaces.

The coding efficiency of generic instructions is improved since no dedicated instructions are required to handle peripherals or CPU memory mapped instructions.

Application code is optimized since peripheral bit manipulations can be performed from single instruction without requiring a temporary CPU data register or pointer.

The context save can be optimized when it requires to push into the stack peripheral resources.

Decoding peripheral access from the instruction qualifier instead of address range eliminates a speed path.

Code size can be improved for applications involving a high level of interfacing with system.

Power consumption can be improved for applications involving a high level of interfacing with system.

Interrupt latency/overhead can be improved from efficient peripheral handling.

The concept can he extended to support different classes of peripherals. Wait states can be dynamically adjusted from the qualifier opcodes.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A method of operating a digital system, comprising the steps of:

executing a sequence of instructions in an instruction pipeline of a processor core, wherein the instructions are fetched in response to a program counter from an instruction memory associated with the processor core;

decoding a first memory access instruction from the sequence of instructions, wherein if a qualifier byte is associated with the memory access instruction then the memory access instruction is decoded in a qualified manner;

accessing a first data item from a memory mapped register after mapping an address provided by the memory access instruction via a memory management unit if the qualifier byte is not present; or accessing the first data item from the memory mapped register by bypassing the memory management unit without mapping the address provided by the memory access instruction if the qualifier byte is present in a first type; and scheduling a second memory access instruction to be decoded in parallel with the first memory access instruction only when the byte qualifier is present, whereby the memory management unit can be used by the second memory access instruction since it is not used by the first memory access instruction.

2. A method of operating a digital system, comprising the steps of:

executing a sequence of instructions in an instruction pipeline of a processor core, wherein the instructions are fetched in response to a program counter from an instruction memory associated with the processor core;

decoding a first memory access instruction from the sequence of instructions, wherein if a qualifier byte is associated with the memory access instruction then the memory access instruction is decoded in a qualified manner;

accessing a first data item from a memory mapped register after mapping an address provided by the memory access instruction via a memory management unit if the qualifier byte is not present; or accessing the first data item from the memory mapped register by bypassing the memory management unit without mapping the address provided by the memory access instruction if the qualifier byte is present in a first type; and wherein if the qualifier byte is present in a second type then the step of accessing is remapped to an input/output address space according to a peripheral data page pointer in the memory management unit, otherwise the step of accessing is mapped to a data address space in accordance with a memory data page pointer in the memory management unit.

3. The method of claim 2, wherein the memory access instruction includes both a read access and a write access, and wherein:

if a second type qualifier byte of a read type is present, then the read access is remapped; or if a second type qualifier byte of a write type is present, then the write access is remapped.

4. A digital system comprising a microprocessor, wherein the microprocessor is operable to execute a sequence of instructions obtained from an instruction bus, wherein the microprocessor comprises:

an instruction buffer unit operable to decode a memory access instruction of the sequence of instructions, wherein if a qualifier byte is associated with the memory access instruction then the memory access instruction is decoded in a qualified manner;

a data address generation unit operable to calculate a first address of a first operand specified by the memory access instruction; and a memory management unit (MMU) connected to receive the first address, the MMU operable to map the first address to form a first mapped address, wherein if a qualifier byte of a first type is present then operation of the MMU is inhibited, such that an access is made without mapping the first address; and wherein if a qualifier byte of a second type is present then operation of the MMU is modified to form a second mapped address such that an access is made to an I/O address space using I/O control signals connected to a peripheral device register rather than memory control signals connected to a bulk memory circuit.

5. The digital system according to claim 4 being a cellular telephone, further comprising:

an integrated keyboard connected to the processor via a keyboard adapter;

a display, connected to the processor via a display adapter;

radio frequency (RF) circuitry connected to the processor; and an aerial connected to the RF circuitry.

* * * * *